United States Patent
Kragelund et al.

(10) Patent No.: US 7,254,247 B2
(45) Date of Patent: Aug. 7, 2007

(54) HEARING AID WITH A MICROPHONE IN THE BATTERY COMPARTMENT LID

(75) Inventors: Lasse Kragelund, Hellerup (DK); Jørgen Skindhøj, Hellerup (DK); Anders Erik Petersen, Hellerup (DK)

(73) Assignee: Oticon A/S, Smørum (DK)

( * ) Notice: Subject to any disclaimer, the term of this patent is extended or adjusted under 35 U.S.C. 154(b) by 176 days.

(21) Appl. No.: 10/497,855

(22) PCT Filed: Dec. 2, 2002

(86) PCT No.: PCT/DK02/00810

§ 371 (c)(1), (2), (4) Date: Jun. 17, 2004

(87) PCT Pub. No.: WO03/049495

PCT Pub. Date: Jun. 12, 2003

(65) Prior Publication Data

US 2005/0123157 A1    Jun. 9, 2005

(30) Foreign Application Priority Data

Dec. 7, 2001   (DK) ............................... 2001 01823

(51) Int. Cl.
*H04R 25/00*   (2006.01)
(52) U.S. Cl. ...................... 381/322; 381/324
(58) Field of Classification Search ............. 381/23.1, 381/312, 191, 313, 322, 323, 324, 328, 330
See application file for complete search history.

(56) References Cited

U.S. PATENT DOCUMENTS

| | | | | |
|---|---|---|---|---|
| 2,787,670 A | * | 4/1957 | Rowland | ..................... 381/324 |
| 2,789,160 A | * | 4/1957 | Gage | ........................... 381/324 |
| 4,712,245 A | | 12/1987 | Lyregaard | .................... 381/324 |
| 5,889,874 A | * | 3/1999 | Schmitt et al. | ............. 381/328 |
| 5,995,636 A | | 11/1999 | Topholm | ..................... 381/323 |
| 6,243,474 B1 | * | 6/2001 | Tai et al. | .................... 381/191 |
| 6,516,074 B1 | | 2/2003 | Brimhall et al. | ............ 381/322 |

FOREIGN PATENT DOCUMENTS

| | | |
|---|---|---|
| DE | 3603704 | 8/1987 |
| WO | 9847319 | 10/1998 |
| WO | 9927755 | 6/1999 |

\* cited by examiner

*Primary Examiner*—Sinh Tran
*Assistant Examiner*—Brian Ensey
(74) *Attorney, Agent, or Firm*—Dykema Gossett PLLC

(57) ABSTRACT

A hearing aid which has a casing accommodating one or more second to electric signal converting transducers (11, 12) and a signal path from the transducer (11,12) to a receiver which provides a sound signal at the ear of the user. The signal processing is provided in the signal path to ensure a signal amplification/attenuation according to the needs of the user. A battery (6) is accommodated in the casing and a battery lid is arranged with a first side (1) facing the surrounding and a second side (2) facing the interior of the casing whereby the battery lid is operable for replacement of the battery. The battery lid has a recess (3) for receiving at least one sound to electric signal converting transducer (11,12) and a sound transmission path is provided between the first side (1) of the battery lid and the at least one transducer (11, 12).

11 Claims, 5 Drawing Sheets

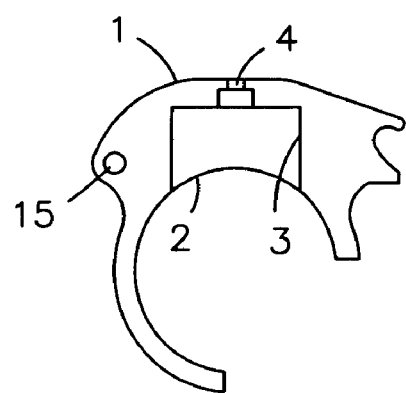
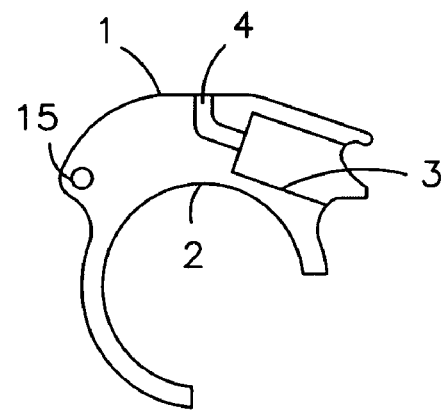
FIG. 1A  FIG. 1B
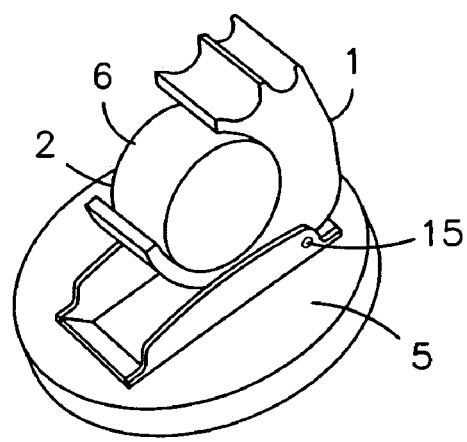
FIG. 1C

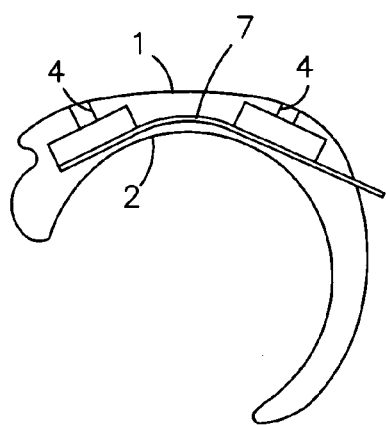 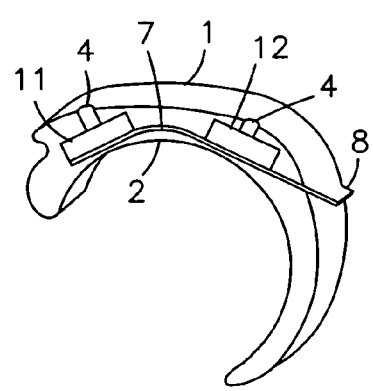
FIG. 2A  FIG. 2B

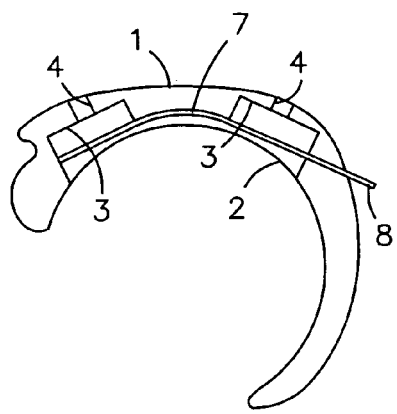
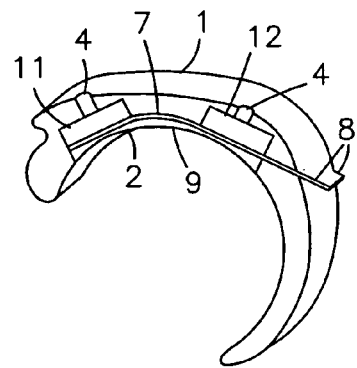
FIG. 3A    FIG. 3B
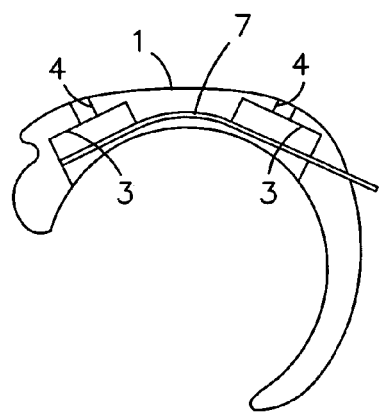
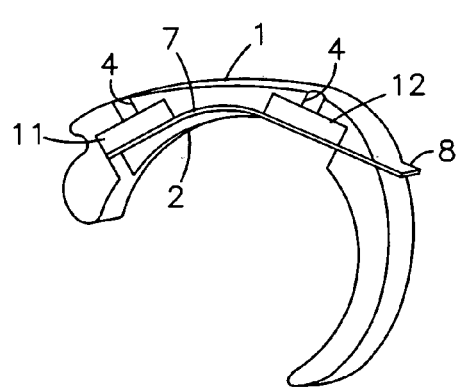
FIG. 4A    FIG. 4B

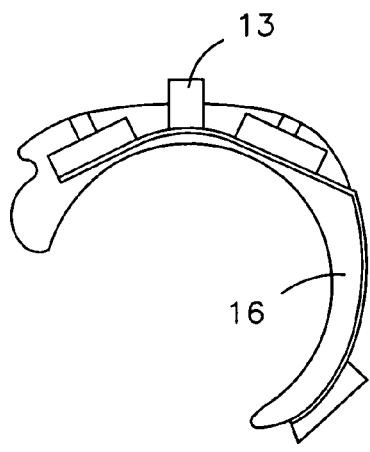
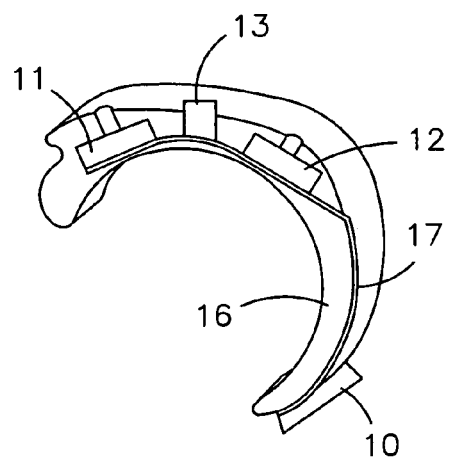
FIG. 5A  FIG. 5B
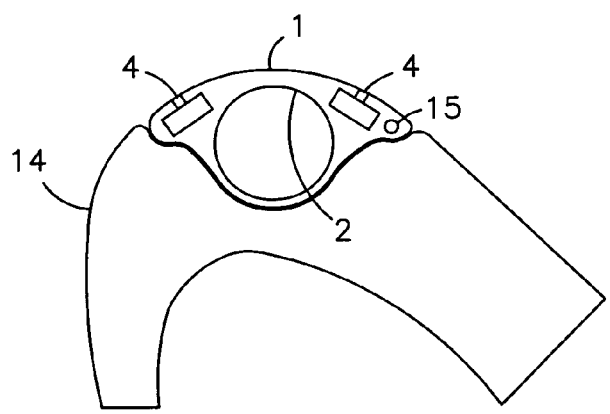
FIG. 6

HEARING AID WITH A MICROPHONE IN THE BATTERY COMPARTMENT LID

AREA OF THE INVENTION

The invention concerns a method of producing a hearing aid comprising a casing and at least one transducer and a signal path from the transducer to a receiver which provides a sound signal at the ear of the user, wherein signal processing is provided in the signal path to ensure a signal amplification/attenuation according to the needs of the user.

The invention further concerns a hearing aid comprising a casing accommodating one or more sound to electric signal converting transducers and a signal path from the transducer to a receiver which provides a sound signal at the ear of the user, wherein signal processing is provided in the signal path to ensure a signal amplification according to the needs of the user, wherein a battery is accommodated in the casing and is replaceable through a battery lid in the casing.

BACKGROUND OF THE INVENTION

In the ear (ITE) hearing aids should be as small as possible and inserted as deeply as possible into the ear canal of the user. This is a general wish from the users of hearing aids. Today the limits of miniaturization are reached in that both the battery lid and the microphone must be placed in the faceplate of the shell. The faceplate is the part of the shell facing the surrounding environment, when the hearing aid is placed within the ear canal. In prior art hearing aids the battery lid and the microphone entrance are placed side by side, and therefore both take up space. The object of the invention is to provide a hearing aid, which is as small as possible, and which is insertable deeper into the ear canal than prior art hearing aids.

In behind the ear style hearing aids it is also a wish from the user that they be as small as possible. A further object of the invention is to provide a hearing aid wherein the microphone or microphones are accommodated in a space saving fashion.

SUMMARY OF THE INVENTION

The objects of the invention are achieved by the method wherein a transducer is embedded in the shell of the hearing aid when produced. By embedding the transducer in the shell part during manufacture, it is assured, that the transducer takes up as little space as possible, and at the same time the transducer is placed very near the surface, which is important as it facilitates the transmission of the sound waves from the surroundings to the active are of the transducer. According to the invention a sound path is provided between an exterior surface of the casing part and the at least one transducer, which is being embedded in the casing material. The sound path is usually an open canal, but filter material may be inserted in the canal to protect the transducer from un-wanted environmental influence.

In an embodiment of the invention the transducer is a MEMS microphone. These microphones are easily embedded in the material of the casing part due to their small size and due to the fact that they also can withstand the temperatures and pressures used during manufacture of the casing part. Preferably injection moulding is used for the production of the casing part. This allows both hard and soft materials to be used. Also it becomes possible to use variable materials in different parts of the shell part. A soft material can be used in the immediate surroundings of the microphone, and a harder material could be used for the rest of the shell part. This will help the transducer to withstand mechanical shocks from handling.

The objects of the invention are further achieved by a hearing aid whereby the battery lid has means for receiving at least one sound to electric signal converting transducer. By placing the transducer in the battery lid, an in the canal hearing aid may be made with a smaller surface area, and it becomes possible to place the hearing aid even deeper within the ear canal of the user. Also in BTE style hearing aids space may be saved by the suggested placement of the microphone. The battery is round in shape and in many BTE hearing aids the battery lid is made with a rather flat surface. Thereby space is wasted in the corners of the battery lid between the round battery and the flat battery lid, and this space may according to the invention be used to accommodate the microphone or microphones of the hearing aid.

In an embodiment of the invention the microphone is a MEMS microphone. These microphones are very small, and in an ITE style hearings aid such a microphone may be integrated in the battery lid practically without any increase in size thereof. This also is the case for BTE style hearing aids.

In an embodiment two transducers are arranged in the battery lid. Hereby directionality may be obtained, or the two microphones may be used in parallel to enhance the signal from the microphones. Especially for MEMS type microphones the signal to noise ration may be low due to the small size of the active membrane, and this makes the use of more than one microphone in parallel advantageous as this may provide better signal to noise ratio.

In one embodiment of the invention the transducer or the transducers are arranged on a first side of a flexprint having electric leads which provides a signal path from the transducers to the amplifier. This is advantageous in that the flexprint can be prepared with a wide number of components before mounting in the hearing aid battery lid. Separate manual handling of the small microphone is thus avoided as these may be picked and placed on the flexprint along with other electrical components before re-flow or other fastening technique producing electric connections.

In a further advantageous embodiment of the invention the flexprint along with the transducers thereon are embedded in the material of the battery lid, and the flexprint extends outside the material of the battery lid. This ensures very secure and mechanically stable fixation of the microphones. Also production-wise this is a good solution as only a minimum of loose parts are to be assembled. The part of the flexprint extending outside the material of the battery lid is used for electrically connecting the microphones with the other electronic component of the hearing aid.

In another embodiment the battery lid has a recess in the second side thereof facing the interior of the casing, and the flexprint and the at least one transducer is retained in said recess by the use of a retaining element. The retainer element is a loose part, and it can be disassembled to allow access to the flexprint and microphones. In this way it becomes possible to make repairs or to replace malfunctioning microphones.

Another solution is to retain the flexprint and the at least one transducer against the second side of the battery lid by the use of glue or similar material. In this way the retainer element may be omitted, but on the other hand it becomes less easy to replace malfunctioning parts.

In a preferred embodiment the flexprint with the at least one transducer extends in an arch following the curvature of the battery exterior, and is electrically connected to the amplifier inside the casing. In this way the microphones and the amplifier may be placed at one and the same flexprint which is held in place at the battery lid. This is a very neat solution with a minimum of loss wiring inside the casing. Also if the battery lid has a part extending along the curvature of the battery towards the inside of the casing and if the flexprint is caused to follow the outside of this part, it is possible to provide programming connection pins directly on the outside surface of this flexprint portion.

In an embodiment of the invention a switching element is placed in the battery lid and extends away from the first side of the battery lid. Preferably the switching element is placed between the two microphones. A switching element is necessary in most hearing aids, either for switching on/of of the apparatus, for choosing a program or for working a volume control. I the switching element is placed on the battery lid, it does not take up any additional space.

BRIEF DESCRIPTION OF THE DRAWINGS

FIG. 1A shows a sideways section through a battery lid with accommodation means for a microphone, FIG. 1B shows a second accommodation means for a microphone in a battery lid, FIG. 1C is a perspective view of a faceplate part with a battery lid having accommodation means for a microphone, FIG. 2A is a sectional view through a battery lid according to an embodiment of the invention, FIG. 2B is a perspective view of the battery lid in FIG. 2A, FIG. 3A is a sectional view through a battery lid according to an embodiment of the invention, FIG. 3B is a perspective view of the battery lid in FIG. 3A, FIG. 4A is a sectional view of the battery lid according to a further embodiment of the invention, FIG. 4B is a perspective view of the battery lid in FIG. 4A, FIG. 5A and FIG. 5B shows a possible placement of the amplifier, FIG. 6 shows a BTE style hearing aid implementing the invention.

DESCRIPTION OF A PREFERRED EMBODIMENT

Figure 7:
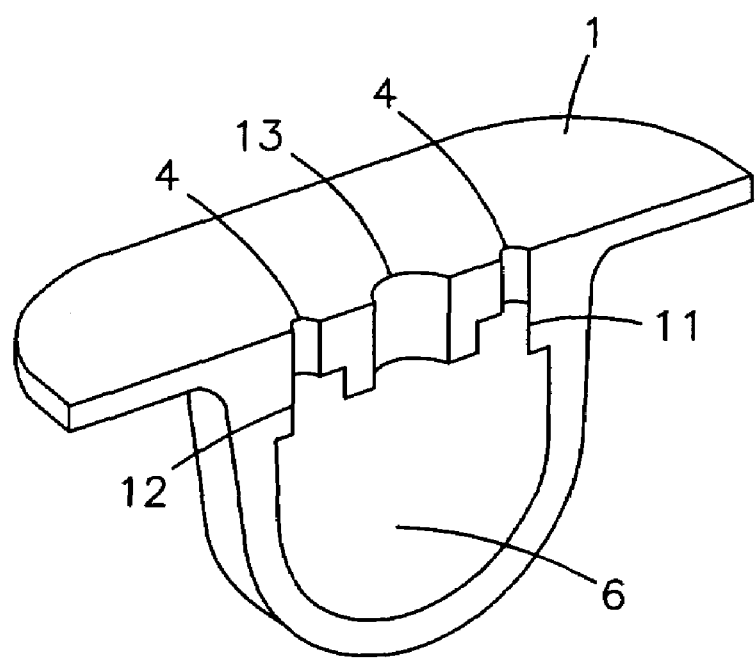
FIG. 7 shows an embodiment of the invention where a rechargeable battery is used.

The battery lid shown in FIGS. 1A and 1B has a first side 1, which is facing the exterior and a second side 2 which faces the interior of the casing (not shown). The second side 2 is usually shaped to snugly fit the curvature of the battery. This can be seen in FIG. 1C, where the battery 6 is shown. In the embodiment of FIGS. 1A and 1B a recess 3 is shaped between the two surfaces 1 and 2. In the embodiment of FIG. 1A the recess is open toward the interior surface 2 and according to the embodiment of FIG. 1B the recess is sideways open and in both cases a microphone is insertable in the recess 3. From the bottom of the recess 3 a canal 4 is formed, which allows sound from the outside to enter the microphone port.

In FIG. 1C the battery 6 and battery lid is shown in perspective view along with a faceplate part 5. In the figure the lid is shown in the open position, and the material between the first surface 1 facing the surroundings and the second surface 2 facing the interior 2 when the lid is in the closed position is used for the recess to accommodate the microphone (not shown in this figure). A hinge pin 14 is shown in FIG. 1C and a hinge pin hole 15 is shown in FIGS. 1A and 1B. The battery lids shown in FIGS. 2–5 may have similar holes for mounting in the faceplate, or they may be mounted in some other way.

In FIGS. 2A and 2B a further embodiment is shown. Here the battery lid accommodates two microphones 11,12 of the MEMS type. The microphones 11,12 in this embodiment are embedded in the material of the battery lid. The MEMS type microphones, which can be made very small, are connected to a flex print strip 7. During production the microphones and flex print assembly is placed in an injection mold, and the material of the battery lid is filled into the mould cavity around the flex print strip 7 and battery assembly. The canals 4 leading from the first side 1 of the battery lid to the active surface of a microphone are also shaped in the injection molding procedure. In order to protect the microphones from the hot melt during the injection molding the microphones may be surrounded be a shielding material like μ-metal. Such a shielding may also protect the microphones against electromagnetic interference. Also a material with a low melting point or a hardening material may be used in order not to harm the microphone.

The two microphones may be used to generate a directional signal or they may simply be used so as to improve the overall signal to noise ratio.

In the embodiment of FIG. 3A and 3B a different solution is shown. Here the microphone and flexprint assembly is placed in a recess 3 in the second side 2 of the battery lid. A holding member 9 is inserted from the back side 2 and fixates the flexprint and microphone assembly. This has the advantage that the microphones are exchangeable, and can be replaced in the event of malfunction. A packing material (not shown) is advantageously used to ensure sound tight joints towards the back side 2 of the battery lid.

In FIGS. 4A and 4B a further possible solution is shown. Here the holding member is replaced by the use of glue or similar joining technique between the flexprint and microphone assembly and the battery lid.

In FIG. 5A and 5B it is shown how the amplifier 10 is placed. Here the flexprint extends outside the material of the battery lid in a curve 17 following the curvature of the battery. In the shown embodiment the battery lid has a back part 16, supporting the battery inside the casing and the flexprint follows the outside curve of this back part 16 to meet with the amplifier inside the casing. As seen the amplifier 10 may be mounted directly on the back part 16 of the battery lid. Also in this figure a shifting element 13 is a shown between the two microphones. The shifting member could be a button for changing program or it could be a volume control button. The shifting element 13 is advantageous placed on the same flexprint as the microphones 11,12.

In the embodiments according to FIGS. 2–4 two microphones are shown, and they are placed at each their end of the battery lid. As seen from the figures the first surface 1 of the battery lid is rather flat, where as the second surface 2 follows the curvature of the battery, and therefore the battery lid has a little more material at each end thereof. This makes the placement of the two microphones in these areas advantageous. Other wayes of placing the microphones within the battery lid materiel is possible.

In FIG. 6 a BTE style hearing aid 14 is shown wherein the invention is realized. The battery lid has a first side 1 facing the environment and a second side 2 facing the inside of the casing. In the first side 1 two microphone sound entrance canals 4 are arranged, and behind the canals 4 recesses are provided for microphones (not shown). The two microphones are placed at each their side of the battery in an area where space is naturally provided by the curvature of the battery. The solutions shown in FIGS. 2–5 for accommodating the microphones may also be used in connection with the BTE stile hearing aid shown in FIG. 6.

The hearing aid part in FIG. 7 has a rechargeable battery 6, which is encased in the shell material of the hearing aid. A rechargeable battery does not need to be exchanged at regular intervals, and a battery lid as such is not required. Possibly the whole unit displayed in FIG. 7 can be a disposable part of the hearing aid, which is discarded once the battery lifetime is up. Alternatively the battery is extractable, through a service opening, but this is not shown. Canals 4 are provided for the sound waves to reach the microphones 11,12. In the embodiment shown the microphones 11,12 are embedded in the casing material. A control button or switching element 13 is placed between the microphone sound canals 4.

The above description is directed to hearing aids, but the invention could also be used in head sets and in hearing protectors or similar communication devices.

The invention claimed is:

1. Method of producing a hearing aid comprising a casing and at least one transducer (11, 12) and a signal path from the transducer (11, 12) to a receiver which provides a sound signal at the ear of the user, wherein signal processing is provided in the signal path to ensure a signal amplification/attenuation according to the needs of a user, whereby the at least one transducer (11, 12) is embedded within the material of a casing part during the production thereof whereby a sound transmission path is provided between an exterior surface (1) of the casing part and the at least one transducer (11, 12), whereby the at least one transducer is mounted to a printed circuit board and where the printed circuit board and transducer assembly is embedded in the casing material during the production of the casing, such that at least an edge part of the printed circuit board is connectable from the inside of the casing.

2. Method as claimed in claim 1, whereby the transducer is a MEMS microphone.

3. Method as claimed in claim 1, whereby the casing is produced by injection moulding.

4. Hearing aid comprising a casing accommodating one or more sound to electric signal converting transducers (11, 12) and a signal path from the transducer (11, 12) to a receiver which provides a sound signal at an ear of a user, wherein signal processing is provided in the signal path to ensure a signal amplification/attenuation according to the needs of the user, wherein the casing includes a faceplate, wherein a battery (6) is accommodated in the casing and wherein a battery lid is arranged with a first side (1) facing the surrounding and a second side (2) facing the interior of the casing whereby the battery lid is operable for replacement of the battery, whereby the battery lid has recess means (3) for receiving at least one sound to electric signal converting transducer (11, 12) and whereby a sound transmission path is provided between the first side (1) of the battery lid and the at least one transducer (11, 12).

5. Hearing aid as claimed in claim 4, wherein the at least one transducer (11, 12) is a MEMS microphone.

6. Hearing aid as claimed in claim 4, wherein the transducer or the transducers (11, 12) are arranged on a first side of a flexprint (7) having electric leads which provides a signal path from the transducers (11, 12) to a signal processing device (10).

7. Hearing aid as claimed in claim 6, wherein the flexprint (7) along with the transducers (11, 12) thereon are embedded in the material of the battery lid, and where the flexprint (7) extends outside the material of the battery lid.

8. Hearing aid as claimed in claim 6, wherein the battery lid has a recess (3) in the second side thereof facing the interior of the casing, and where the flexprint (7) and the at least one transducer (11,12) is retained in the recess (3) by the use of a retaining element (9).

9. Hearing aid as claimed in claim 7 wherein the flexprint (7) and the at least one transducer (11, 12) are retained against the second side of the battery lid by the use of glue or similar fastening technique.

10. Hearing aid as claimed in claim 6, wherein the flexprint (7) with the at least one transducer (11, 12) extends in an arch following the curvature of the battery exterior, and is electrically connected to the signal processing device (10) inside the casing.

11. Hearing aid as claimed in claim 10, wherein a switching element (13) is placed in the battery lid and extends away from the first side (1) of the battery lid.

* * * * *